US008688871B2

(12) United States Patent
Takakusaki

(10) Patent No.: US 8,688,871 B2
(45) Date of Patent: Apr. 1, 2014

(54) ELECTRONIC DEVICE AND INPUT-SIGNAL SWITCHING METHOD

(75) Inventor: Masahiko Takakusaki, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 13/161,914

(22) Filed: Jun. 16, 2011

(65) Prior Publication Data

US 2012/0026406 A1 Feb. 2, 2012

(30) Foreign Application Priority Data

Jul. 27, 2010 (JP) ................................ 2010-168338

(51) Int. Cl.
*G06F 3/00* (2006.01)
*G06F 13/00* (2006.01)

(52) U.S. Cl.
USPC .......... 710/40; 710/5; 710/19; 710/33; 710/62

(58) Field of Classification Search
USPC ........................................... 710/5, 19, 33, 62
See application file for complete search history.

(56) References Cited

U.S. PATENT DOCUMENTS

| 6,756,974 | B2 * | 6/2004 | Nakajima et al. | 345/204 |
| 8,195,851 | B1 * | 6/2012 | Teng et al. | 710/72 |
| 2001/0055029 | A1 * | 12/2001 | Nakajima et al. | 345/629 |
| 2005/0259112 | A1 | 11/2005 | Suzukawa et al. | |
| 2007/0171198 | A1 * | 7/2007 | Yokozawa | 345/156 |
| 2008/0062002 | A1 | 3/2008 | Uehara | |
| 2008/0297371 | A1 * | 12/2008 | Ida | 340/825.52 |
| 2010/0049890 | A1 * | 2/2010 | Best et al. | 710/73 |
| 2010/0095241 | A1 * | 4/2010 | Nagano et al. | 715/790 |
| 2011/0109600 | A1 * | 5/2011 | Yamamoto et al. | 345/204 |
| 2012/0099021 | A1 * | 4/2012 | Kamida | 348/563 |

FOREIGN PATENT DOCUMENTS

| JP | H09-083881 A | 3/1997 |
| JP | 2001-094890 A1 | 4/2001 |
| JP | 2004-086641 A | 3/2004 |
| JP | 2005-340953 A | 12/2005 |
| JP | 2007-282068 A | 10/2007 |
| JP | 2008-071074 A | 3/2008 |

OTHER PUBLICATIONS

Japanese Office Action dated Jul. 26, 2011 of corresponding Japanese Patent Application No. 2010-168338.
Notice of Rejection mailed by Japan Patent Office on Jul. 2, 2013 in the corresponding Japanese patent application No. 2012-056391, which is a divisional patent application for JP No. 2010-168338.

* cited by examiner

*Primary Examiner* — Scott Sun
(74) *Attorney, Agent, or Firm* — Knobbe, Martens, Olson & Bear LLP

(57) ABSTRACT

According to one embodiment, an electronic device receives inputs of video signals from a plurality of input systems. The electronic device includes a priority determination table, a video switching instruction module, a video switching module. In the priority determination table, video display priorities of the video signals from the input systems are determined in advance. The video switching instruction module instructs to switch among the video signals from the input systems on the basis of the priorities determined in the priority determination table. The video switching module switches among the video signals from the input systems according to a switching instruction from the video switching instruction module.

4 Claims, 6 Drawing Sheets

ELECTRONIC DEVICE AND INPUT-SIGNAL SWITCHING METHOD

CROSS-REFERENCE TO RELATED APPLICATIONS

This application is based upon and claims the benefit of priority from Japanese Patent Application No. 2010-168338, filed Jul. 27, 2010, the entire contents of which are incorporated herein by reference.

FIELD

Embodiments described herein relate generally to an electronic device and an input-signal switching method.

BACKGROUND

There has been disclosed information devices having personal computer (PC) priority mode in which a video signal output from a video-signal processing circuit in a control module is displayed in preference to a video signal from a signal processing module connected to an external input terminal.

Such an information device cannot give preference to the video signal from the signal processing module connected to the external input terminal over the video signal output from the video-signal processing circuit in the control module.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device receives inputs of video signals from a plurality of input systems. The electronic device comprises a priority determination table, a video switching instruction module, and a video switching module. In the priority determination table, video display priorities of the video signals from the input systems are determined in advance. The video switching instruction module is configured to instruct to switch among the video signals from the input systems on the basis of the priorities determined in the priority determination table. The video switching module is configured to switch among the video signals from the input systems according to a switching instruction from the video switching instruction module.

Figure 1:
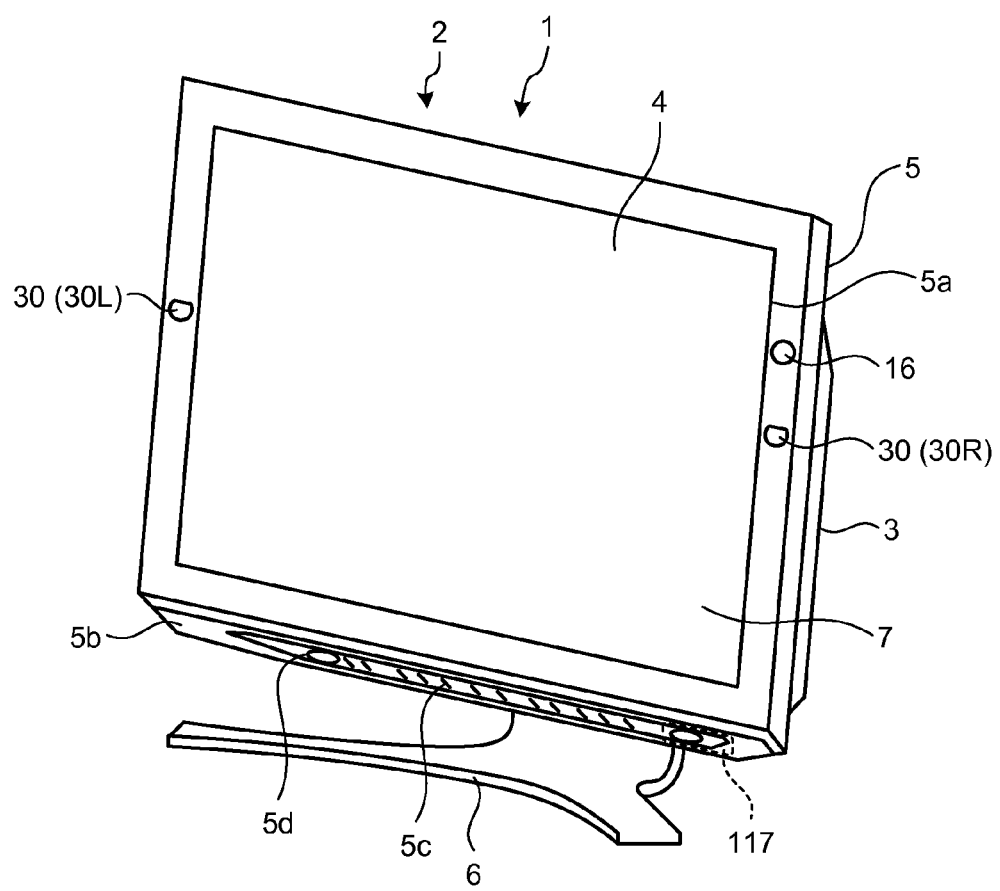
FIG. 1 is an exemplary appearance perspective view of an electronic device according to an embodiment.
Figure 2:
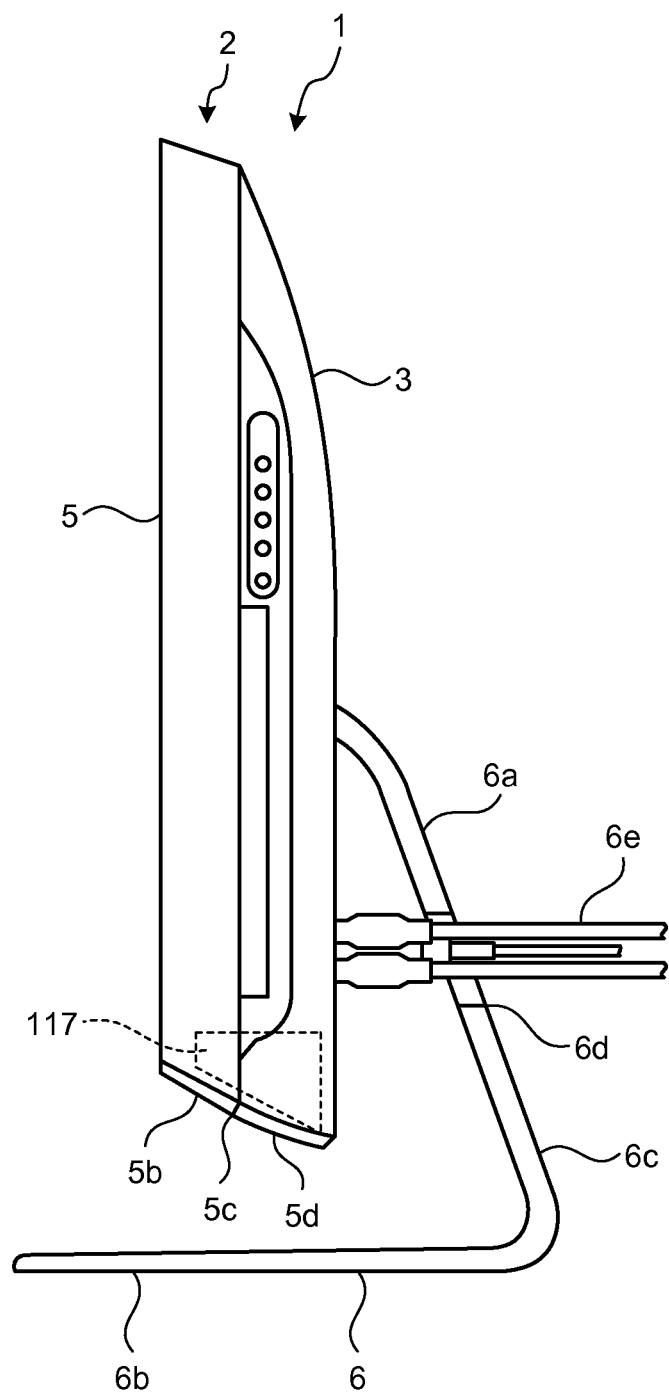
FIG. 2 is an exemplary side view of the electronic device in the embodiment.
Figure 3:
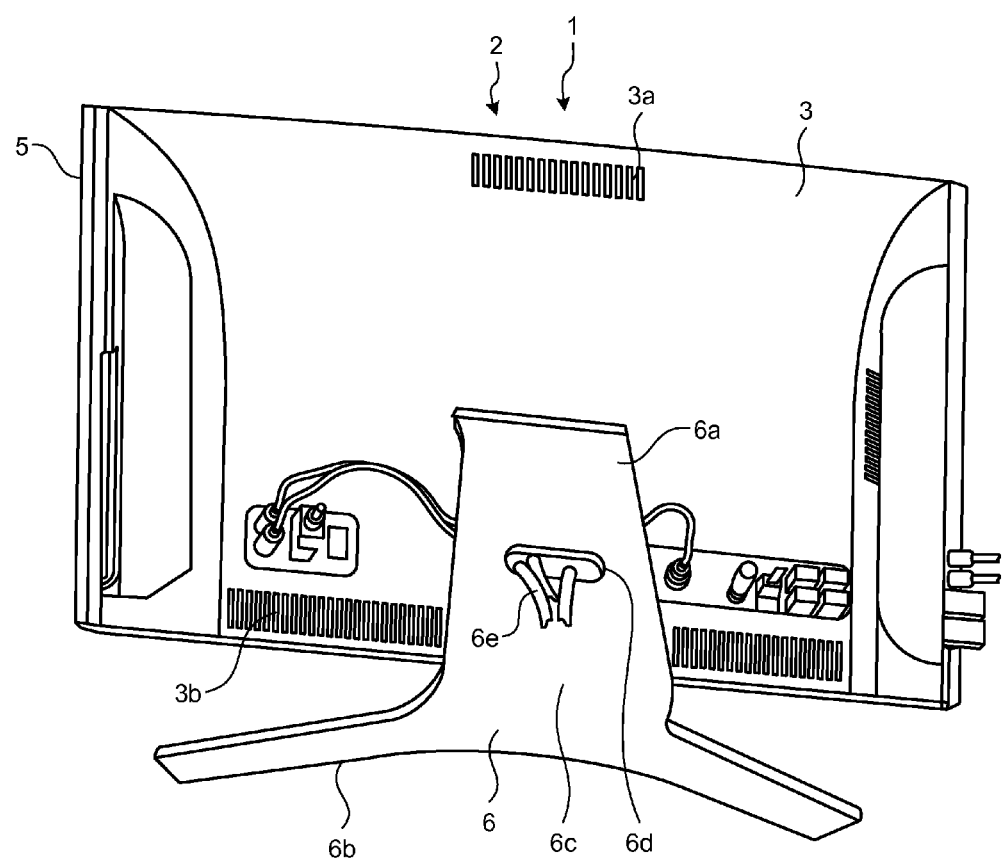
FIG. 3 is an exemplary rear view of the electronic device in the embodiment.

FIG. 1 is a perspective view illustrating an example of an all-in-one personal computer (hereinafter, referred to as "electronic device") 1 as a broadcast-wave receiving apparatus according to an embodiment. FIG. 2 is a side view of the electronic device 1. FIG. 3 is a rear view of the electronic device 1. The electronic device 1 comprises a built-in television receiver (a TV tuner). The electronic device 1 is a personal computer (PC) that comes with major peripherals and contains a main body of the personal computer, a keyboard and a mouse as well as a display, a sound card, a speaker, a modem (or a network card), and the like in advance, and is preinstalled with an operating unit (OS) such as Windows (registered trademark).

As illustrated in FIGS. 1 to 3, the electronic device 1 comprises a housing 2 and a display 4 such as a liquid crystal display (LCD). The display 4 receives a video signal from a video-signal processing circuit 120 (see FIG. 5) in a PC control module 150 (see FIG. 5) comprising electronic components and the like and mounted on a circuit board, and displays thereon an image, such as a still image or a moving image. The housing 2 of the electronic device 1 has a cover 3 and a mask 5. The cover 3 is provided with an exhaust hole 3a and a first intake hole 3b. The mask 5 is provided with an opening 5a, an inclined surface portion 5b, a second intake hole 5c, and a sound emitting portion 5d. The opening 5a is connected to the cover 3 via the display 4 held between them, and exposes the display 4. The inclined surface portion 5b extends toward the cover 3. The second intake hole 5c and the sound emitting portion 5d are located on the inclined surface portion 5b. Such a configuration of the housing 2 makes it possible to introduce air into the electronic device 1 from both front and back sides (the user side and the opposite side of the user side) of the housing 2, and cooling efficiency is improved.

The inclined surface portion 5b is located on the lower side of the housing 2, and extends in a direction of expanding toward the cover 3. Such a configuration of the housing 2 enables the apparent size of the housing 2 in user's eyes to seem to be smaller than the actual size. While an example is described herein in which the mask 5 and the inclined surface portion 5b are adjoined to each other, it is not so limited, and the inclined surface portion 5b may be connected to the cover 3 and the mask 5 as a separate member.

A speaker 117 is mounted between the inclined surface portion 5b and the cover 3. An output module of the speaker 117 for outputting a sound faces the sound emitting portion 5d. Such a configuration makes it possible to ensure the capacity of the speaker 117, and also to direct an output direction of a sound from the speaker 117 toward the side of the display 4 of the electronic device 1, i.e., the user side.

The housing 2 is supported by a support 6. The support 6 has an end portion 6a connected to an area in the central part of the cover 3, a leg 6b set on the set plane such as a top board of a desk, and a middle portion 6c connecting the end portion 6a and the leg 6b. The middle portion 6c is provided with an opening 6d. The opening 6d has a shape extending along a long side of the electronic device 1. The opening 6d is located at about the same level as a plurality of cables 6e connected to the electronic device 1 from the side of the cover 3. Such a configuration makes it possible to put the cables 6e through the opening 6d. This helps to make the cables behind the electronic device 1 less noticeable when the electronic device 1 is viewed from the front.

The electronic device 1 further comprises a touch panel 7. The touch panel 7 is overlaid on the display 4. The touch panel 7 has two mutually-pasted transparent conductive films (not illustrated). When a user presses a particular point on the touch panel 7 with his/her finger or a stylus, etc., the transparent conductive films conduct electricity at the point on the touch panel 7, and thereby the pressed point can be detected. A signal indicating the pressed point on the touch panel 7 is sent to the PC control module 150, and the PC control module 150 performs a process based on the signal. Incidentally, the touch panel 7 is not limited to such a resistive (pressure-sensitive) type touch panel, but may be a capacitive type touch panel or other types.

In the embodiment, push button mechanisms 30 and a power button 16 operated to power on or off the electronic device 1 are exposed on the opening 5a which exposes the display 4.

Figure 4:
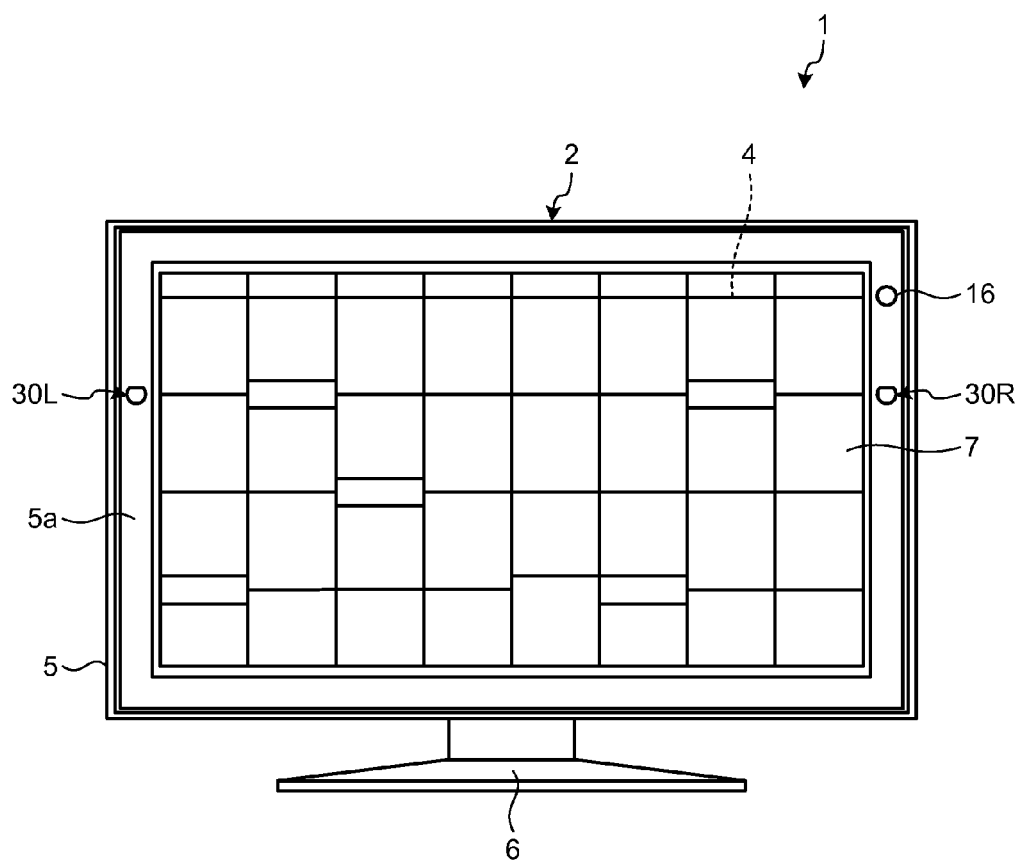
FIG. 4 is an exemplary front view of a display screen of the electronic device in the embodiment.

In the embodiment, the left-hand push button mechanism 30 illustrated in FIG. 1 is assigned to work as an operation button 30L for displaying, for example, a screen illustrated in FIG. 4. The screen illustrated in FIG. 4 displays, for example, a program guide. Meanwhile, in the embodiment, the right-hand push button mechanism 30 illustrated in FIG. 1 is assigned to work as an operation button 30R for connecting the electronic device 1 to the Internet.

As described above, in the embodiment, on the opening 5a which exposes the display 4, the push button mechanisms 30 are provided as an operation mechanism for receiving a pressing operation. Therefore, it is possible to perform the pressing operation on the push button mechanism 30 more reliably as compared to the case where the push button mechanism is provided to the housing.

According to the embodiment, the mechanical operation buttons 30L and 30R are provided on the side of the front face of the electronic device 1, i.e., on the opening 5a which exposes the display 4. Accordingly, a user interface can be provided on the side of the main body of the device, and it is possible to improve the operability and the convenience. For example, by pressing the operation button 30L, which is assigned to work as a button for displaying a program guide, on the user's left-hand side of the electronic device 1, a program guide at the time can be displayed immediately. A user can easily set a timer for tuning in to or recording a desired program which he/she wants to watch by just touching a field of the program in the program guide.

Figure 5:
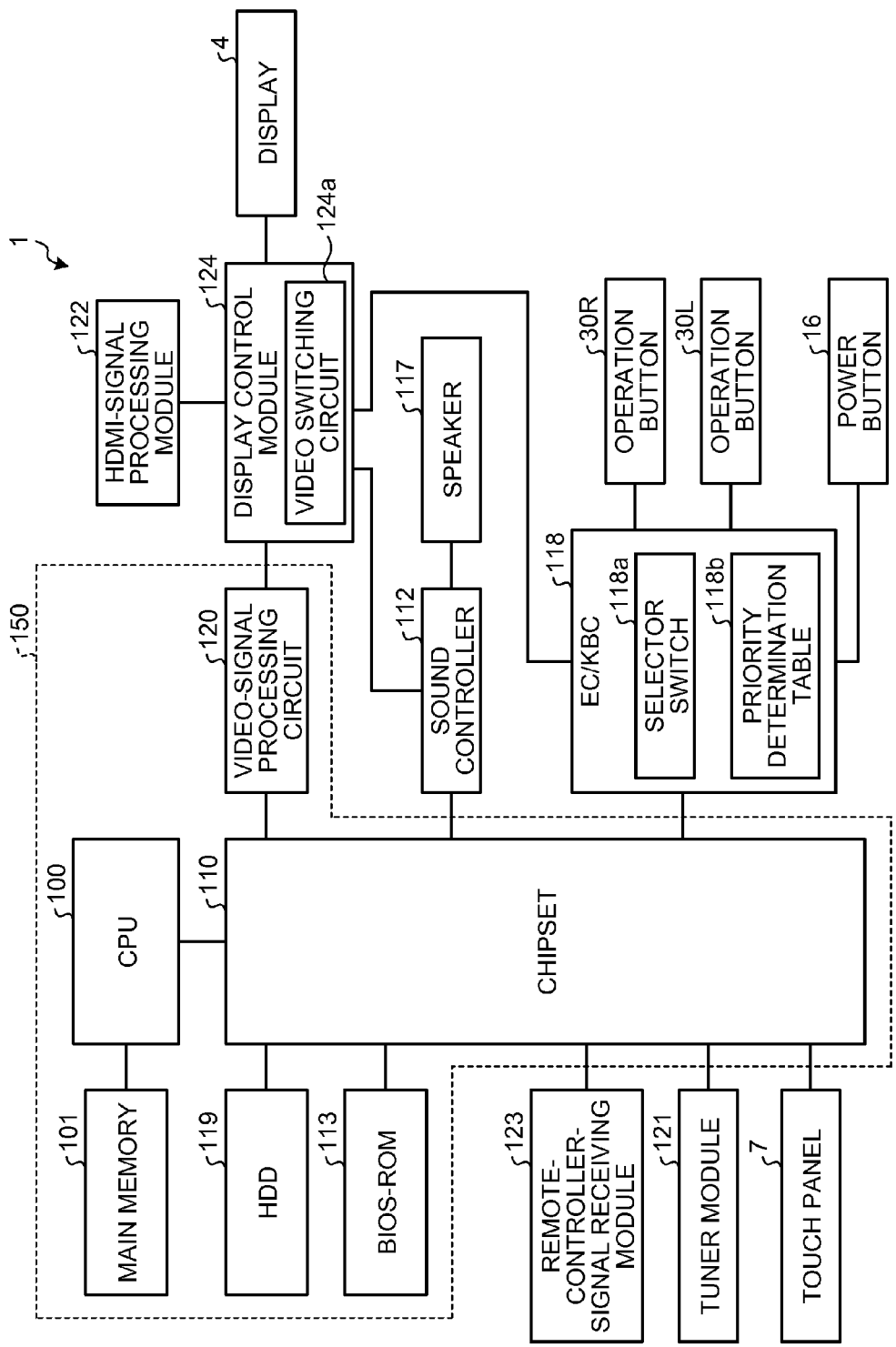
FIG. 5 is an exemplary block diagram of a control system of the electronic device in the embodiment.

In the following, a control system of the electronic device 1 will be described with reference to FIG. 5. As illustrated in FIG. 5, the electronic device 1 comprises the PC control module 150 for working as a personal computer. The PC control module 150 comprises a central processing unit (CPU) 100 as a controller, a main memory 101 such as a random access memory (RAM), a chipset 110, a basic input-output system (BIOS)-read only memory (ROM) 113, a hard disk drive (HDD) 119, and the video-signal processing circuit 120. The touch panel 7, a sound controller 112, an embedded controller/keyboard controller (EC/KBC) 118 working as a signal control module, a tuner module 121, a remote-controller-signal receiving module 123, and the like are connected to the chipset 110.

The CPU 100 is a processor provided to control the operation of the electronic device 1, and executes the OS, various application programs, and the like which are loaded into the main memory 101 from a storage medium, such as the HDD 119. The application programs include a TV application. The TV application fulfills a TV-program timer recording function and the like. The CPU 100 also executes a system BIOS stored in the BIOS-ROM 113. The system BIOS is a program for controlling hardware. The chipset 110 controls input/output (I/O) devices, such as a serial advanced technology attachment (ATA), a universal serial bus (USB), and a local area network (LAN).

A display control module 124 is connected to the video-signal processing circuit 120. As one of the functions, the display control module 124 converts a video signal output from the video-signal processing circuit 120 from transition minimized differential signaling (TMDS) into low voltage differential signaling (LVDS) and outputs the converted video signal to the display 4.

Furthermore, a high-definition multimedia interface (HDMI)-signal processing module 122 is connected to the display control module 124. The HDMI-signal processing module 122 is connected to an HDMI terminal which is an external input terminal. The display control module 124 converts a video signal received from a game machine or the like via the HDMI-signal processing module 122 into LVDS, and outputs the converted video signal to the display 4.

The system BIOS sets a priority determination table for determining priorities for switching among output screens for the display 4 according to a video signal output from the video-signal processing circuit 120 or a video signal output from the HDMI-signal processing module 122. In the embodiment, as the priority determination table, any of the following settings is made.

1. set priority on a video signal output from the video-signal processing circuit 120 (PC priority mode)
2. set priority on a video signal output from the HDMI-signal processing module 122 (external-input priority mode)
3. not define priority Such a priority determination table is retained as a priority determination table 118b of the EC/KBC 118. Incidentally, the priority-determination-table switching priority can be changed by a user through an OS such as Windows (registered trademark).

The display control module 124 comprises a video switching circuit 124a as a video switching module for switching between a video signal input from a game machine or the like via the HDMI-signal processing module 122 and TMDS which is a video signal output from the video-signal processing circuit 120.

The EC/KBC 118 outputs signals according to operations on the various buttons including the operation button 30R working as an Internet button, the operation button 30L working as a program guide button, and the power button 16. The EC/KBC 118 comprises a selector switch 118a and the priority determination table 118b. The selector switch 118a works as a video switching instruction module for instructing the video switching circuit 124a of the display control module 124 to switch a video signal according to the setting of the priority determination table 118b.

The sound controller 112 controls the speaker 117.

A description will be given of characteristic function performed by the display control module 124 and the EC/KBC 118 with reference to FIG. 6. Upon receipt of a video signal, the display control module 124 outputs the received video signal to the EC/KBC 118.

Figure 6:
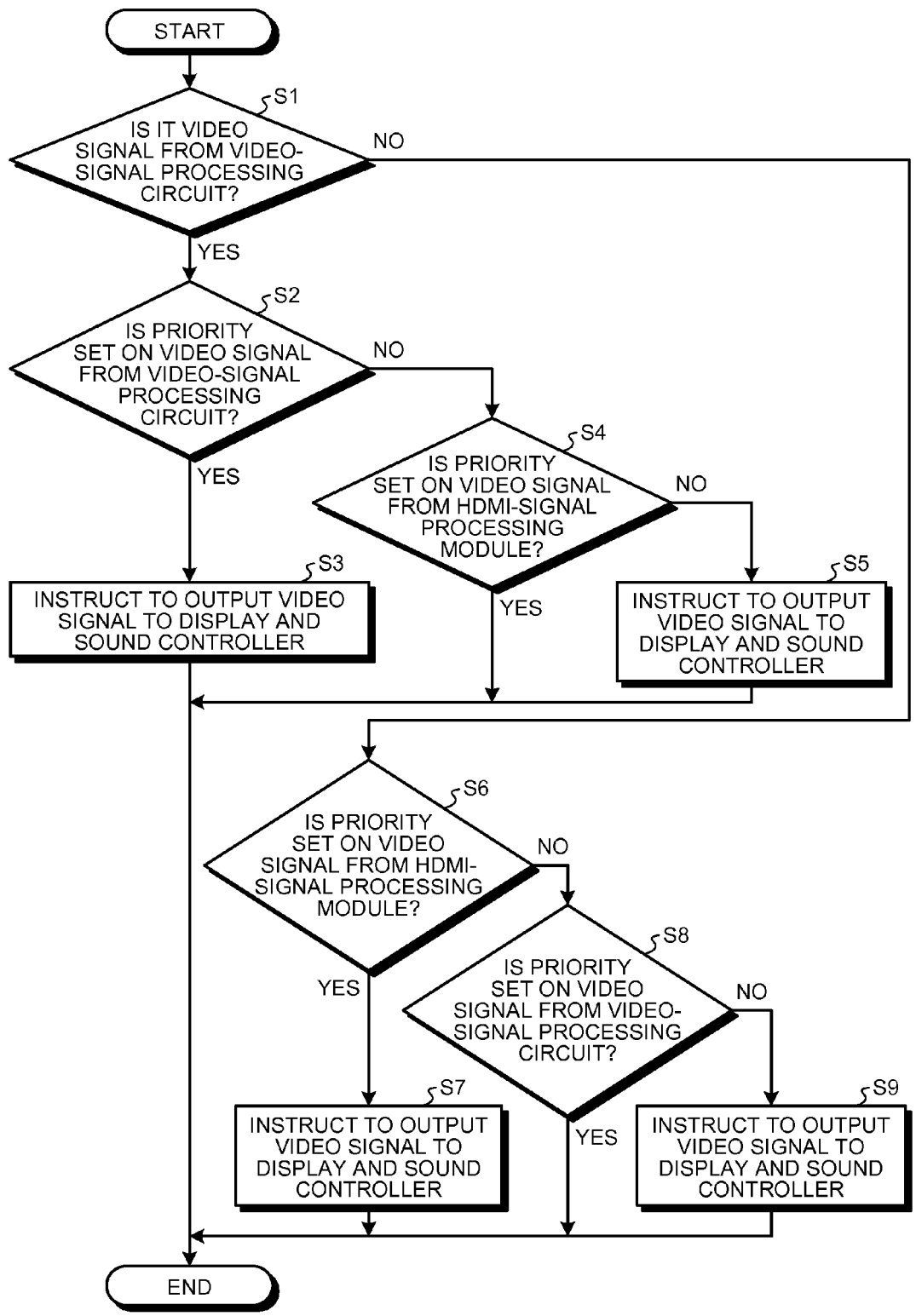
FIG. 6 is an exemplary flowchart of a video-signal switching process.

As illustrated in FIG. 6, when receiving the video signal, the EC/KBC 118 determines whether the video signal is received from a game machine or the like via the HDMI-signal processing module 122 or output from the video-signal processing circuit 120 (S1).

When the EC/KBC 118 determines that the video signal is output from the video-signal processing circuit 120 (Yes at S1), if priority is set on the video signal output from the video-signal processing circuit 120 with reference to the priority determination table 118b (Yes at S2), the selector switch 118a of the EC/KBC 118 instructs the video switching circuit 124a of the display control module 124 to output the video signal output from the video-signal processing circuit 120 to the display 4 and the sound controller 112 (S3).

On the other hand, even if the EC/KBC 118 determines that the video signal is output from the video-signal processing circuit 120 (Yes at S1), if priority is set on a video signal output from the HDMI-signal processing module 122 with reference to the priority determination table 118*b* (No at S2, Yes at S4), the selector switch 118*a* of the EC/KBC 118 terminates the process without instructing the video switching circuit 124*a* of the display control module 124 to output the video signal output from the video-signal processing circuit 120.

Incidentally, when the EC/KBC 118 determines that the video signal is output from the video-signal processing circuit 120 (Yes at S1), if priority is not defined with reference to the priority determination table 118*b* (No at S2, No at S4), the selector switch 118*a* of the EC/KBC 118 instructs the video switching circuit 124*a* of the display control module 124 to output the video signal output from the video-signal processing circuit 120 to the display 4 and the sound controller 112 (S5).

When the EC/KBC 118 determines that the video signal is output from the HDMI-signal processing module 122 (No at S1), if priority is set on the video signal output from the HDMI-signal processing module 122 with reference to the priority determination table 118*b* (Yes at S6), the selector switch 118*a* of the EC/KBC 118 instructs the video switching circuit 124*a* of the display control module 124 to output the video signal output from the HDMI-signal processing module 122 to the display 4 and the sound controller 112 (S7).

On the other hand, even if the EC/KBC 118 determines that the video signal is output from the HDMI-signal processing module 122 (No at S1), if priority is set on a video signal output from the video-signal processing circuit 120 with reference to the priority determination table 118*b* (Yes at S8), the selector switch 118*a* of the EC/KBC 118 terminates the process without instructing the video switching circuit 124*a* of the display control module 124 to output the video signal output from the HDMI-signal processing module 122.

Incidentally, when the EC/KBC 118 determines that the video signal is output from the HDMI-signal processing module 122 (No at S1), if priority is not defined with reference to the priority determination table 118*b* (No at S6, No at S8), the selector switch 118*a* of the EC/KBC 118 instructs the video switching circuit 124*a* of the display control module 124 to output the video signal output from the HDMI-signal processing module 122 to the display 4 and the sound controller 112 (S9).

With this, in the electronic device 1 according to the embodiment, when the priority determination table 118*b* is set to the PC priority mode, even if an external cable (HDMI) is connected, a video signal from the PC control module 150, a part working as a personal computer, can be given priority. On the other hand, when the priority determination table 118*b* is set to the external input priority mode, if an external cable (HDMI) is connected, a video signal through the external cable (HDMI) can be given priority even when a video signal from the PC control module 150, a part working as a personal computer, is displayed.

Further, in the electronic device 1 according to the embodiment, the display control module 124 and the EC/KBC 118 are independent of the PC control module 150. Thus, even when the PC control module 150 is not active (in OFF state), it is possible to display a video signal output from the HDMI-signal processing module 122 via the external cable (HDMI).

As described above, in the electronic device 1 according to the embodiment, the selector switch 118*a* of the EC/KBC 118 instructs to switch among video signals received from a plurality of input systems on the basis of priorities defined in the priority determination table 118*b* in which video display priorities of the video signals from the input systems are determined in advance. The video switching circuit 124*a* of the display control module 124 switches among the video signals input from the input systems according to the switching instruction from the selector switch 118*a* of the EC/KBC 118. In this manner, modes can be automatically switched with respect to video signal input, and thereby it is possible to improve the convenience of users.

Incidentally, the system BIOS executed by the electronic device 1 according to the above embodiment may be provided as being stored in a computer-readable recording medium, such as a compact disc read-only memory (CD-ROM), a flexible disk (FD), a compact disc-recordable (CD-R), or a digital versatile disc (DVD), in an installable or executable file format.

The system BIOS may also be provided as being stored in a computer connected to a network, such as the Internet, so that it can downloaded via the network. The system BIOS may also be provided or distributed via a network, such as the Internet.

While the above embodiment is described as being applied to an all-in-one personal computer, the embodiments may be applied to other electronic devices, such as a computer (a notebook computer, a desktop computer), a personal digital assistant (PDA), a smartbook, a smartphone, and a mobile phone unit.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device configured to receive video signals from a plurality of input systems, the electronic device comprising:
   a priority determination table comprising a predetermined video display priority for each of the video signals;
   a video switching instruction module configured to generate a switching instruction to switch among the received video signals based on the predetermined video display priorities in the priority determination table; and
   a video switching module configured to switch among the received video signals based on the switching instruction from the video switching instruction module,
   wherein the plurality of input systems comprises:
      a video-signal processing circuit in a control module of a personal computer; and
      a signal processing module connected to an external input terminal, and
      wherein the signal processing module, the priority determination table, the video switching instruction module, and the video switching module operate regardless of whether the control module is active or not.

2. The electronic device of claim 1, wherein the priority determination table is set by a basic input/output system, and setting of the priorities is variable.

3. The electronic device of claim 1, wherein the priority determination table and the video switching instruction module are included in a controller configured to output a signal according to operation of at least one button.

4. A method of input-signal switching for an electronic device, the electronic device configured to receive video signals from a plurality of input systems, the method comprising:
  generating, at a video switching instruction module, an instruction to switch among the video signals received from the plurality of input systems based on predetermined video signal priorities in a priority determination table; and
  switching, at a video switching module, among the video signals according to the generated instruction,
  wherein the plurality of input systems comprises:
    a video-signal processing circuit in a control module of a personal computer; and
    a signal processing module connected to an external input terminal, and
  wherein the signal processing module, the priority determination table, the video switching instruction module, and the video switching module operate regardless of whether the control module is active or not.

\* \* \* \* \*